INVENTORS
DONALD C. ROCKOLA
FLOYD V. BOOKOUT
BY Davis, Lucas, Brewer & Brugman
ATTORNEYS

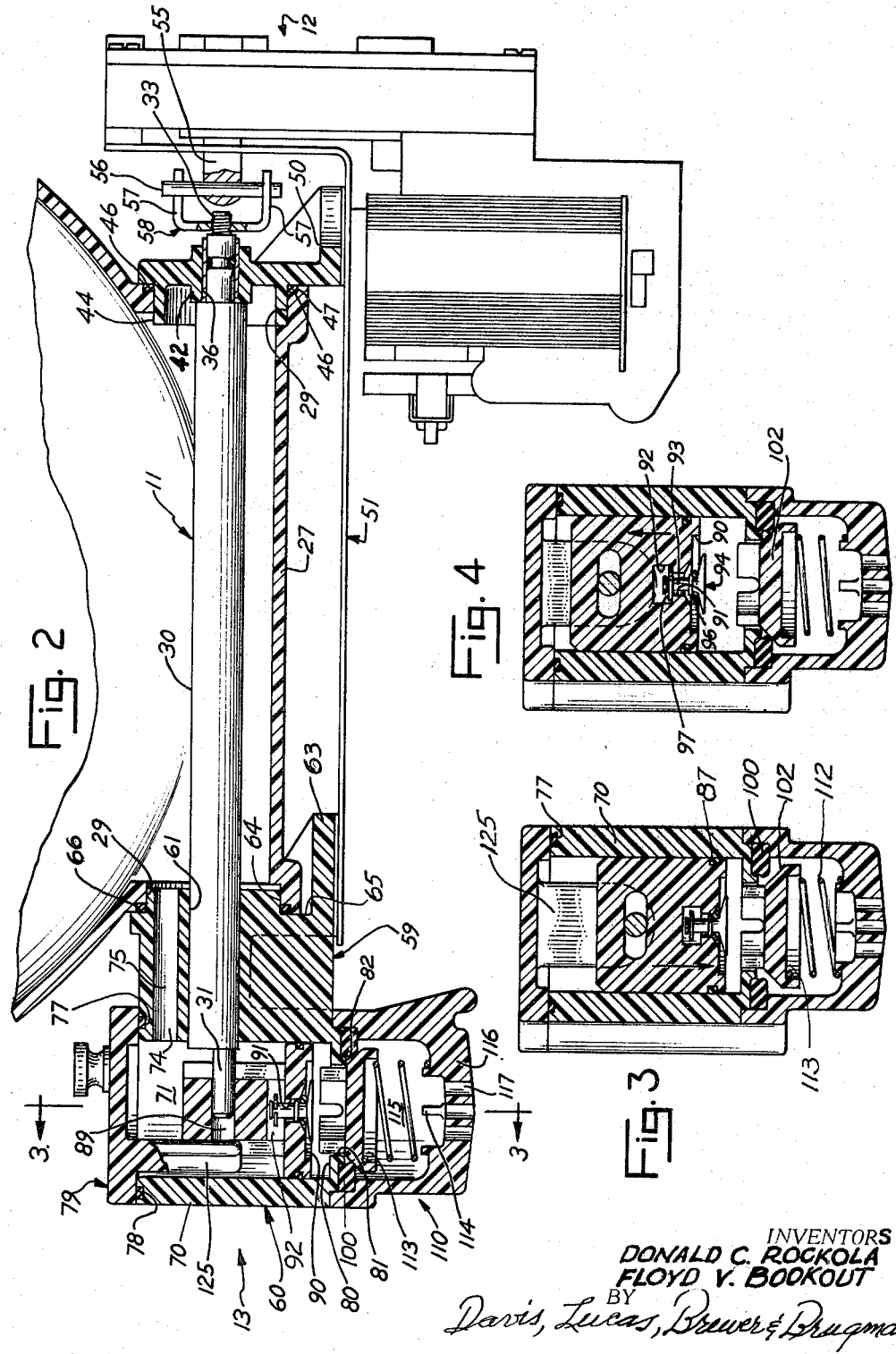

United States Patent Office 3,493,149
Patented Feb. 3, 1970

3,493,149
LIQUID MEASURING AND DISPENSING APPARATUS
Donald C. Rockola, Chicago, and Floyd V. Bookout, Long Grove, Ill., assignors to Rock-Ola Manufacturing Corporation, Chicago, Ill., a corporation of Delaware
Filed June 7, 1968, Ser. No. 735,338
Int. Cl. G01f 11/04; B67d 5/40; F04b 9/04
U.S. Cl. 222—333                                6 Claims

ABSTRACT OF THE DISCLOSURE

Apparatus for use in automatic vending machines, particularly soft drink machines, for storing and dispensing measured quantities of liquid beverage flavoring ingredients including a storage tank having a gravity outlet, a measuring pump mounted over the outlet and including a reciprocally driven piston equipped with a check valve mounted within an enclosed cylindrical measuring chamber which is is also equipped with a flow control valve so that quantities of liquid ingredients are successively measured and discharged in response to selected actuation of the piston.

---

This invention relates generally to beverage dispensing apparatus and more particularly to improved means for measuring and dispensing quantities of beverage flavoring liquids.

Automatic coin vending machines for dispensing beverages such as coffee, tea, milk, fruit juices and various flavored cold drinks and the like, are a familiar part of the American economic scene. Recent developments in cold drink dispensing have made it feasible to flavor beverages, particularly non-carbonated beverages, with liquid flavoring ingredients, as opposed to powdered or dry flavoring ingredients. This development has gained favorable acceptance inasmuch as beverages made with the liquid flavorings are more uniform in texture and flavor and are more rapidly intermixed. The use of such liquid flavoring ingredients is particularly advantageous from the standpoint of avoiding powdering and caking problems which accompany the use and handling of the usual dry beverage flavoring ingredients. However, the successful handling and control of such liquid flavoring materials to gain accurate measuring and delivery of uniform quantities for desirable uniformity of the end beverage products, has given rise to new problems. It is to this particular area that the present invention is directed.

In brief the improved apparatus of this invention comprises an improved combination of a liquid storage vessel adapted to discharged liquid ingredients gravitationally into a measuring pump capable of being periodically cycled on demand to measure and deliver uniform quantities of the flavoring ingredients to mixing means, wherein the flavoring liquid is intermixed with a carrier, such as carbonated water or the like, to produce a beverage product to be dispensed to the customer. Uniquely, the pump means of the combination hereof includes a simplified piston and cylinder assembly coupled by eccentric drive means to a selectively energizable motor for periodically reciprocating the piston within a surrounding cylinder. The cylinder functions as a means for measuring out a selected quantity of the flavoring ingredient which is thereafter conditioned for discharge from the cylinder in response to a pumping stroke of the piston. Both the piston and the cylinder are equipped with suitable and oppositely operating control valve means capable of effecting the desired measuring function during the movement of the piston in one direction and delivering such measured quantity from the cylinder in response to movement of the piston in an opposite direction.

An important object of this invention is to provide a new and improved liquid storing, measuring, and delivering means, particularly useful in automatic drink vending machines.

Another important object of this invention is to provide improved pump means for delivering measured quantities of liquid.

A still further object of this invention is to provide an improved and simplified, liquid storing, measuring and delivering apparatus for liquid beverage flavoring ingredients, whereby measured quantities of such ingredients may be selectively delivered for admixture with other liquids to form potable beverages and the like.

Having thus described the present invention, the above and further objects, features and advantages thereof will be readily recognized by those familiar with the art from the following detailed description of a preferred embodiment of its features in conjunction with the illustration set out in the accompanying drawings.

In the drawings:

FIGURE 2 is an enlarged cross-sectional view of the lower portion of the apparatus illustrated in FIGURE 1, illustrating the assembled relationship of parts therein;

FIGURE 3 is a cross-sectional view taken substantially along vantage line 3—3 of FIGURE 2 and looking in the direction of the arrows thereon; showing the operational positioning of parts during a delivery cycle of the pump means; and FIGURE 4 is a cross-sectional view, similar to FIGURE 3 showing the operational positioning of parts during a measuring cycle of the pump means.

Figure 1:
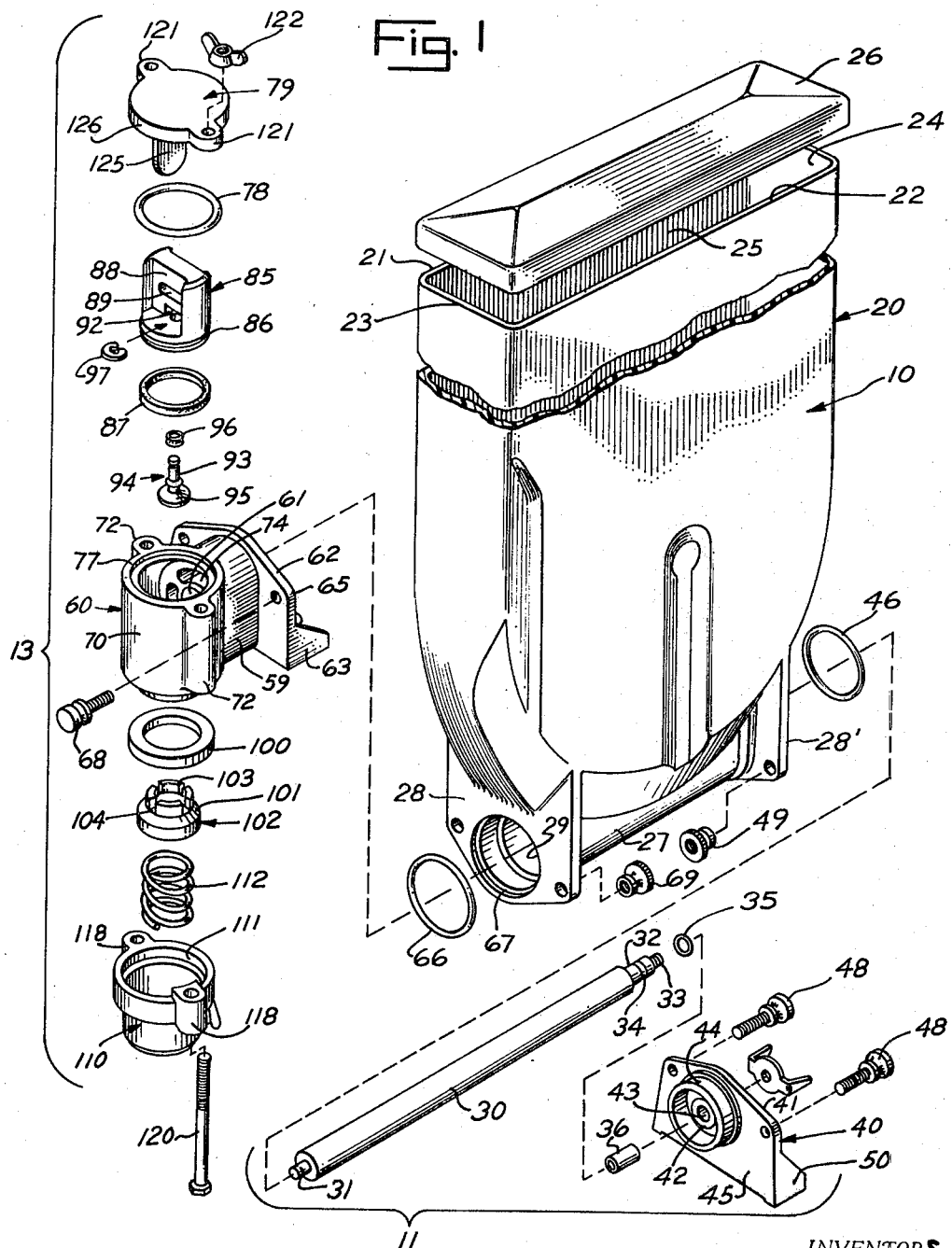
FIGURE 1 is an exploded perspective view of improved apparatus embodying the features of the present invention.

Turning now to the particulars of the preferred embodiment of this invention shown in the accompanying drawings, initial reference is made to FIGURE 1 wherein a majority of the component parts of the illustrated embodiment are set forth in exploded perspective arrangement, indicative of their assembly relationship.

As shown, the improved combination of this invention comprises a reservoir canister means, indicated generally by numeral 10, drive means 11 located at the lower end of the canister means and adapted to be actuated periodically by selected energization of an electrical drive motor means 12 (see FIG. 2); and a pump means 13 which is operationally responsive to actuation of the drive means 11. The pump means 13, like the drive means, is located at the lower end of the canister means 10; the latter of which is normally positioned in upright operating condition with the pump means being operationally positioned for discharge to a succeeding mixing stage of the vending mechanism (not illustrated herein).

Reservoir means 10 comprises a generally rectangular shaped hollow container or liquid reservoir section 20 formed as a unitary molding and having parallel side walls 21, 22 integrally joined with parallel front and back walls 23, 24, respectively. An open upper end 25 of the reservoir section 20 is enclosed by a removable cap or cover 26. The lower regions of the several walls 21–24 converge into the open upper side of a generally cylindrical shaped sump section 27 formed at the lower end of the reservoir section and formed integrally with the several walls of the latter. It is to be noted that the longitudinal axis of the sump section 27 is generally transverse to the longitudinal axis of the reservoir section 20 and lies parallel to walls 21 and 22. At the opposite ends of the sump section are parallel spaced, generally planar mounting flange portions 28, 28', each having enlarged, central and generally cylindrical openings 29 formed therethrough to communicate openly with the opposite ends of the sump section 27. Preferably, the reservoir section, the sump section and the mounting flange portions are all integrally related and united as a monolithic molding of nylon or similar plastic material, with the interior walls generally paralleling the exterior walls and surfaces of the reservoir means 10. In operation, the reservoir section 20 is adapted to hold a body of liquid, such as liquid flavoring ingredients, which gravitates downwardly into the sump section 27 for regulated discharge therefrom, as will appear from descriptive materials which follow.

Drive means 11 as shown herein, comprises a cylindrical drive shaft 30 having a cylindrical eccentric projection portion 31 extending from one end thereof, and a coaxial cylindrical shoulder portion 32 formed at its opposite end. The extreme outer end of the shoulder portion 32 is distinguished by a threaded portion 33 of reduced diameter and a seal receiving groove 34 is formed intermediate the ends of the shoulder portion 32 for housing a seal ring 35 comprising an annular rubber O-ring. A bearing or bushing sleeve, of generally cylindrical formation 36 fits over the cylindrical shoulder portion 32 in assembly and effects sealing engagement with the O-ring seal 35 mounted in groove 34 (see FIG. 2). Shaft 30 is operationally arranged to extend coaxially of the sump section 27 with the opposite ends thereof projecting beyond the mounting flange portions 28, 28', as will best be understood by examining FIGURE 2 of the drawings.

Bearing support for the shaft means 30 is provided adjacent shoulder portion 32 (the right hand end of the shaft 30 in FIG. 2) by means of a bearing cap member 40 formed as a unitary molded structure having a generally planar body portion 41 distinguished by a central cylindrical boss portion 42 having a central cylindrical bore 43 formed therethrough for receiving the sleeve bushing 36 in assembly. An annular collar 44 is formed concentrically about the central boss portion 42 to project outwardly of one face 45 of the body portion 41 thereof. An annular O-ring seal 46 concentrically surrounds and engages the exterior base of the collar portion 44 to effect sealing engagement with the opening 29 on the rearward flange portion 28' of the reservoir means 10 (see FIG. 2). More particularly, it will be understood from FIGURE 2 that the collar portion 44 fits concentrically within the opening 29 in mounting flange portion 28' so that the O-ring seal 46 is compressed between the face 45 of the bearing cap member 40 and an annular seat 47 formed on the mounting flange portion 28'. Suitable mounting bolts 48 pass through appropriate openings formed in bearing cap unit 40 and registeringly aligned openings in the mounting flange portion 28' to cooperate with nuts 49 for securing the bearing cap to the mounting flange 28', in the manner illustrated in FIGURE 2 of the drawings. It will be noticed in this respect, that the bearing cap unit 40 includes a rearwardly projecting pad or foot portion 50 aligned at right angles to the lower side of body portion 41 thereof to provide a support means for mountnig the same on an underlying metal frame member 51 associated with the vending machine, in which the present invention is used.

Motor means 12 similarly is supported on the frame member 51, immediately to the rear of the bearing cap unit 40, as shown in FIGURE 2. Shaft 55 of the motor means 12 projects through the frame member 51 and drives a yoke pin 56 which extends transversely of the motor shaft 55 to engage rearwardly extending, spaced arm portions 57, 57 of a drive yoke member 58. The yoke member is threaded onto the threaded portion 33 of the shaft member 30 and thus rotational driving of the motor shaft 55 causes a corresponding rotational driving of the drive shaft 30.

Shaft 30 also is supported adjacent its forward end about the portion thereof which extends beyond the front mounting flange portion 28 of the reservoir means 10 as best shown in FIGURE 2 of the drawings. As shown in that figure, a bearing portion 59 of a molded pump body member 60 is formed with a cylindrical shaft bore 61 therethrough which coaxially receives the projecting portion of the shaft 30. Portion 59 of the pump body also includes a planar platform portion 62 at the rearward end thereof, formed with a mounting foot portion 63, similar to the formation of the platform portion 45 and mounting portion 50 of unit 40, previously described. A cylindrical boss portion 64 extends outwardly of the rearward face 65 of the platform portion 62, concentrically about drive shaft 30, for close fitting reception in opening 29 of the adjacent mounting flange 28 on the reservoir means. An O-ring seal 66 is mounted about the cylindrical boss portion 64 in an annular seat 67 to effect fluid tight seal with the reservoir means, as illustrated in FIGURE 2. Bolt means 68 pass through registeringly aligned openings in portions 62 and 28 for threaded engagement with nut members 69 whereby to removably mount the valve body member 60 over one end of the reservoir sump portion.

It is to be particularly noted that whereas the rearward or right hand end of the shaft member 30, as viewed in FIGURE 2 of the drawings, is suitably supported in bearing bushing 36, the opposite end of said shaft member is mounted freely in the bore 61 of the valve body which openly communicates with the interior of the sump portion 27. In operation, with the sump portion 27 full of liquid, a liquid film or bearing is provided between the walls of bore 61 and the exterior of that portion of shaft 30 which resides in bore 61.

Turning now to the pump means 13, the same includes as heretofore noted, the pump body 60 which in addition to the bearing portion 59 thereof is formed with an integrally related pump cylinder portion 70 defining an interior cylindrical pump chamber 71 having a longitudinal axis transverse to the axis of drive shaft member 30 and bore 61. The exterior of portion 70 is distinguished by a pair of projecting ear portions 72, 72 diametrically arranged on opposite sides thereof and comprising semi-cylindrical projections having interior bolt receptive openings extending the full length thereof.

Pump chamber 71, as best shown in FIGURES 1 and 3, openly communicates with a plurality of ports 74 in one side wall thereof, which open into passageway means 75 extending about bore 61 along portion 59 to communicate between the interior of chamber 71 and the interior of the sump portion 27 in assembly (see FIG. 2). Passageway means 75 extend generally parallel to the shaft bore 61, and radially outwardly thereof.

The upper end of the cylinder portion 70 is provided with an annular recess 77 receptive of a cap seal O-ring 78 for effecting sealing engagement with a cap member 79 adapted to be mounted over the open upper end of the chamber 71.

The lower end of the chamber 71 is provided with a radially inwardly extending annular flange portion 80 having a central opening 81 therethrough, which is bordered by a depending annular lip portion 82 for purposes which will appear presently (see FIG. 2–4).

Mounted within the cylinder chamber 71 is a piston assembly comprising a piston member 85 of generally cylindrical configuration which is grooved circumferentially adjacent the lower end thereof at 86 to receive an O-ring piston seal 87.

The generally cylindrical body of the piston member 85 is cut away along parallel chords on opposite sides thereof to provide a central diametrically extending connecting rod portion 88 distinguished by an intermediate slotted opening 89 aligned transversely of the longitudinal axis of the piston 85. The lower face of the piston member 85 has a shallow counterbore 90 (see FIGS. 2–4) formed with a central countersunk opening 91 extending coaxially between the bottom of the piston and a cutaway 92 formed through the base end of the connecting rod portion 88. The opening 91 receives the cylindrical shank portion 93 of a bleeder check valve member 94 having a mushroom shape head potrion 95 at the lower end thereof. An annular O-ring seal 96 fits about the shank portion 93 immediately adjacent such head portion 95.

In its mounted position the upper end of shank portion 93 projects into the cut away opening 92 at the lower end of the connecting rod portion 88 of the piston member. This provides access to the upper end of the shank portion 93 for mounting a C-ring clip 97 thereon to hold the bleeder check valve loosely assembled with the piston member while affording limited axial movement thereof, as will be described later herein.

It is to be noted that the cutaway sides of the piston member 85 are aligned opposite the ports 74 in the side walls of the cylinder chamber 71, so that liquid introduced to the passageways 75 flows into the upper end of the chamber 71 and openly gravitates to the lower end of the connecting rod portion 88 and particularly the opening 91 in which the bleeder check valve 94 is mounted.

Mounted over the lower end of the cylinder portion 70 of the valve body and in concentrically surrounding relationship with the depending lip portion 82 about opening 81 in the lower end of the piston chamber 71, is a check valve seal 100, comprising an annular rubber or elastomeric ring. The check valve seal is engaged by a chamfered frusto-conical shoulder 101 of a check valve member 102 distinguished by an interrupted cylindrical skirt portion at its upper end and comprising four arcuate segments 103 separated by ports or passageways 104. Such segments 103 fit into and are guided by the central opening 81 in the bottom end of the chamber 71.

A nozzle housing 110 of generally cylindrical formation, is provided over the lower end of the valve body; such having an open upper end distinguished by a cylindrical counterbore or recessed shoulder portion 111 which fits snugly over the exterior periphery of the check valve seal 100 (see FIG. 2) for holding that seal against the underface of the bottom wall portion 90 at the lower end of the valve body. The nozzle housing also houses the check valve member 102 and supports a check valve spring 112 in assembly. The upper end of spring 112 fits into a cylindrical recess 113 formed in the bottom face of the check valve. The lower end of spring 112 fits over a plurality of spaced guide ears 114, arranged in a circular pattern, projecting upwardly into the nozzle chamber 115 comprising the hollow interior of the nozzle housing 110. The lower or bottom end wall 116 of the nozzle housing is provided with a plurality of discharge openings 117 which permit gravity discharge of liquid from nozzle chamber 115. The exterior of the nozzle is distinguished by a pair of diametrically opposed mounting ear projections 118, 118 which cooperatively align with the external projections 72, 72 on the valve body portion 70, to receive elongated fastening bolts 120 therethrough, for holding the pump parts in their assembled relationship. As will be noted especially from FIGURE 2 of the drawings, the upper ends of the mounting bolts 120 are threaded and extend through portions 121 and 121 formed on the cap member 79, for connection with removable wing nuts 122. Such wing nuts permit ready disassembly of the pump which is particularly helpful when cleaning the pump.

It is to be noted that the cap member 79 includes, in addition to its generally cylindrical main body portion 126, a depending tongue portion 125 which is adapted to extend into the upper end of pump chamber 71 adjacent one side thereof. From FIGURES 3 and 4 in particular, it will be noted that the tongue portion 125 fits alongside of the piston's connecting rod portion 88 paralleling one of the cut away sides thereof. Such tongue portion acts as a guide means to prevent rotational movement of the piston means within the confines of the cylinder chamber 71 thereby to maintain the piston aligned properly transversely of the longitudinal axis of drive shaft 30.

When the pump assembly 13 is coupled in operating relationship with the drive means 11, the eccentric pin portion 31 of the drive shaft 30 extends into the transverse slotted opening 89 of the piston member, as best shown in FIGURE 2 of the drawings. With this relationship, it will be immediately understood that rotation of the shaft 30 in response to selected energization of the motor means 12, effects cranking motion to the eccentric projection portion 31 thereof and correspondingly serves to reciprocate the piston means axially within the pump chamber 71.

While it is believed that those familiar with this art will readily recognize and appreciate the structural features and combinations of elements in the described preferred embodiment of this invention, the operational aspects thereof will now be set forth briefly, for which purpose particular reference is made to FIGURES 2, 3 and 4 of the drawings.

OPERATION

In operation the assembled combination of this invention serves to sequentially measure and dispense a quantity of liquid flavoring ingredient or the like from the reservoir means in response to selected energization of the motor means 12 as dictated by appropriate customer operated selector switch means and circuitry (not shown) associated with the deposit of a predetermined coin value for a selected drink according to familiar practice in the automatic vending machine art. Of novel consequence in this combination is the combined functioning of the pump assembly as a means for measuring and delivering predetermined quantities of liquid to a subsequent stage of the vending cycle for operation.

With respect to the operation of the particular preferred embodiment of this invention illustrated in the accompanying drawings, it will be readily understood and appreciated that the reservoir means 10 and particularly section 20 thereof is adapted to receive and store liquid ingredients, such as liquid flavoring syrup for soft drinks, within its hollow interior. To this end the sump section 27 thereof gravitationally fills with liquid from the overdisposed reservoir section 20 so as to flood the passageway means 75 leading to the ports 74 in one wall of the pump cylinder chamber 71. This gravity supply to the pump chamber is maintained so long the the level of liquid in the sump remains above the level of the passageway means 75 leading to the pump chamber. As shown in FIGURE 2 of the drawings, the pump piston is therein illustrated at the bottom of its down stroke whereat the check valve means 102 is tightly seated against the check valve seat and seal 100 under the influence of spring means 112, and the bleeder check valve 94 is closed against seal 96. In this state of events liquid flowing through the passageway means 75 and ports 74 into the upper end of the pump chamber 71, fills the volume above and about the upper side of the piston. The volume of liquid thus filling the upper part of chamber 71 is thereby premeasured for subsequent discharge, as will be explained presently.

As the shaft member 30 continues to rotate in response to energization of the motor means 12, the eccentric projection 31 causes piston means 85 to move upwardly away from its FIGURE 2 position toward its illustrated FIGURE 4 position. During such upward movement of the piston, check valve 102 is relieved of pressure and closes under urging of spring 112. Meanwhile the bleeder check valve 94 is forced downwardly by the liquid pressurized above the piston to unseat or open such valve. Opening of valve 94 permits liquid above the piston to flow through the passageway 91 to the lower side of the piston thereby filling the space between the piston and the lower end of pump chamber 71, and completing the measurement of a predetermined quantity for discharge. It is to be noted that valve 94 normally opens by gravity so long as the piston remains static. Normally, the piston moves with a single downstroke and single upstroke for each vending cycle. Thus rotation of the shaft member 30 is limited to a single rotation with each selected energization of the motor means 12, although this may be changed to one or more rotations of the shaft, as dictated by any particular operating condition.

Thus it will be understood that the volume of liquid above the piston in chamber 71, as viewed in FIGURE 2, is sequentially delivered to the portion of chamber 71 below the piston as the latter is moved to the upper end of its stroke as viewed in FIGURE 4. This cycle of events effectively conditions the measured amount of liquid for subsequent delivery or discharge past the check valve means 102. In normal circumstances the FIG. 4 position of parts for the pump means obtains at the end of any given vending cycle. That is to say, valve 94 is open, check valve 102 is closed and liquid is held in the lower portions of the piston chamber ready for discharge in response to the next selected downstroke of the pump piston. Consequently, upon energization of the motor means 12 and attendant rotation of the shaft means 30, the piston means 85 is driven downwardly in the manner illustrated in FIGURE 3 of the drawings, causing the bleeder check valve 94 to close by pressing seal 96 tightly against the frusto-conical seat or counter sunk portion of opening 91. With valve 94 closed liquid is forced downwardly against the check valve 102. This causes the latter to open by moving from its seated engagement with the check valve seal 100, compressing the spring means 112. This operation pressurizes the liquid between the lower face of the piston means and the check valve, forcing the same past the check valve and into the discharge chamber 115 of the nozzle member from whence it gravitates through the discharge openings or ports 117 to a subsequent mixing means, delivery trough or other stage disposed therebelow in a typical vending mechanism.

Meanwhile, during the downward stroke of the piston means 85 as above described, the bleeder check valve 94 closes and the portion of the cylinder chamber 71 above the piston is again filled with liquid under gravity flow to measure a subsequent quantity of liquid to be delivered by the piston means as described.

From the above it is believed that those familiar with the art will readily recognize and appreciate that the periodic cycling of the piston means in accordance with the embodiment of this invention hereinabove described, causes successive measuring of the desired quantities of liquid and delivery thereof to a succeeding stage of the vending mechanism with which the present invention is preferably associated. Further, while this invention has been described herein in association with the particular preferred embodiment illustrated in the accompanying drawings, it is to be understood that the same is subject to various changes, modifications and substitutions of equivalents without necessarily departing from the spirit and scope of the invention. As a consequence, it is intended that the present invention be unlimited by the foregoing description and accompanying illustrations.

We claim:

1. In an automatic beverage vending machine, apparatus for storing, measuring and dispensing selected quantities of liquid beverage flavoring ingredients comprising: reservoir means including a hollow section for storing liquid ingredients and a sump section opening communicating with said hollow section for gravitationally receiving liquid therefrom; drive means comprising motor means mounted adjacent said sump section, shaft means extending through said sump section, and means coupling said shaft means to said motor means whereby selected energization of the latter serves to rotatably drive said shaft means; pump means mounted on said reservoir means including a bearing portion rotatably supporting a portion of said shaft means extending outwardly of said sump section, a cylindrical piston chamber having ports adjacent one end thereof openly communicating with said sump section for receiving liquid therefrom, one end of said chamber being closed and the opposite end thereof being open, piston means mounted in said chamber and having driving connection with said shaft means whereby said piston means is reciprocated along said chamber in response to rotation of said shaft means, check valve means mounted over the open end of said chamber and normally positioned to close the same, and bleeder valve means operable to control unidirectional flow of liquid past said piston means in response to movement of said piston means away from said check valve means and to prevent such flow in response to movement of said piston means toward said check valve means whereby liquid gravitationally flows from said sump section to fill the volume between said piston means and sealed end of said chamber when said bleeder valve means is closed and is subsequently delivered past said piston means to fill the volume between said check valve means and said piston means when said bleeder valve means is open.

2. The combination of claim 1 including discharge nozzle means about said check valve means, and spring means extending between said nozzle means and check valve means for normally biasing the latter to closed condition over said opening.

3. The combination of claim 1 wherein said connection between said shaft means and said piston means comprises a portion projecting outwardly of one end of said shaft means and related eccentrically with respect to the rotational axis thereof, and a slotted opening formed in said piston means, receptive of said projecting portion and aligned in a manner to effect reciprocating movement of said piston means in response to rotation of said shaft means.

4. The combination of claim 3 including guide means in said chamber for maintaining said piston means in appropriate alignment therein whereby said projecting portion on said shaft means is drivingly engaged with said slotted opening.

5. The combination of claim 1 wherein said piston means carries seal means for effecting fluid tight engagement with the walls of said chamber.

6. The combination of claim 1 wherein said bleeder valve means gravitationally moves to open position when said piston is at rest.

References Cited

UNITED STATES PATENTS

| 2,634,885 | 4/1953 | North | 222—385 X |
| 2,675,759 | 4/1954 | Yarger | 103—213 X |
| 2,957,420 | 10/1960 | Reynolds et al. | 103—213 X |

SAMUEL F. COLEMAN, Primary Examiner

H. S. LANE, Assistant Examiner

U.S. Cl. X.R.

103—213; 222—383